(12) United States Patent
Kobata

(10) Patent No.: US 7,096,745 B2
(45) Date of Patent: *Aug. 29, 2006

(54) SEAT-LOAD MEASURING APPARATUS

(75) Inventor: Toshihiko Kobata, Omihachiman (JP)

(73) Assignee: Takata Corporation, Tokyo (JP)

( * ) Notice: Subject to any disclaimer, the term of this patent is extended or adjusted under 35 U.S.C. 154(b) by 90 days.

This patent is subject to a terminal disclaimer.

(21) Appl. No.: 10/791,700

(22) Filed: Mar. 4, 2004

(65) Prior Publication Data

US 2004/0206191 A1 Oct. 21, 2004

(30) Foreign Application Priority Data

Apr. 18, 2003 (JP) ............................. 2003-113992

(51) Int. Cl.
*G01D 7/00* (2006.01)
(52) U.S. Cl. ................................. 73/862.041
(58) Field of Classification Search ................ 73/862, 73/381, 862.041, 862.474, 862.391, 795; 702/173; 280/735, 806; 177/144; 180/273
See application file for complete search history.

(56) References Cited

U.S. PATENT DOCUMENTS

| | | | |
|---|---|---|---|
| 6,520,023 B1 * | 2/2003 | Kimura | 73/795 |
| 6,571,647 B1 | 6/2003 | Aoki et al. | |
| 6,732,593 B1 * | 5/2004 | Sakamoto et al. | 73/856 |
| 6,739,206 B1 * | 5/2004 | Ishida | 73/862.391 |
| 6,841,741 B1 * | 1/2005 | Kajiyama | 177/144 |
| 6,943,695 B1 * | 9/2005 | Kobata | 340/667 |
| 2004/0237668 A1 * | 12/2004 | Kobata et al. | 73/862.391 |

FOREIGN PATENT DOCUMENTS

| | | | |
|---|---|---|---|
| JP | 2000-258234 A | 9/2000 | |
| JP | 2002-116081 A | 4/2002 | |

* cited by examiner

*Primary Examiner*—Max Noori
*Assistant Examiner*—Octavia Davis
(74) *Attorney, Agent, or Firm*—Foley & Lardner LLP

(57) ABSTRACT

A seat load measuring apparatus that includes a seat rail between a seat-load measuring apparatus and a vehicle floor. The apparatus includes a base frame and a base bracket that provide a load support mechanism to support a load heavier than a predetermined load imposed on the vehicle seat.

10 Claims, 10 Drawing Sheets

Lower Edge

PRIOR ART

SEAT-LOAD MEASURING APPARATUS

BACKGROUND

The present invention relates to a seat-load measuring apparatus mounted under a seat rail for guiding a seat of a vehicle, such as a car, so as to measure the load imposed on the vehicle seat.

As this type of seat-load measuring apparatus, seat-load measuring apparatuses 104 have been proposed which are mounted under seat rails 103 for guiding a vehicle seat 102, on which a person 101 sits, in order to measure the load imposed on the vehicle seat 102, as shown in FIGS. 10(A) to 10(C) (for example, see Japanese Unexamined Patent Application Publication No. 2000-258234, hereinafter "Patent Document 1").

In each seat-load measuring apparatus 104, a lower surface of a base 105 that has an upward-pointing angular-U shape in cross section is fixed to a seat mounting section 107 of a vehicle body with seat brackets 106 at the front and rear ends therebetween, and the seat rail 103 and the base 105 are connected by a pin bracket (hereinafter, also referred to as a rail bracket) 108 serving as a connecting bracket that has a downward-pointing angular-U shape in cross section. In this case, the seat rail 103 is firmly connected to the flat upper surface of the pin bracket 108, and a bracket pin (hereinafter, also referred to as a stopper bolt) 109 is passed through pin holes 108a and 108b provided in the left and right side plates of the pin bracket 108 and pin holes 105a and 105b provided in the left and right side plates of the base 105, thereby connecting the seat rail 103 to the base 105.

On the other hand, a seat-load measuring apparatus has been proposed which ensures measuring accuracy without any influence of manufacturing errors of a vehicle floor by placing a seat rail between the seat-load measuring apparatus and the vehicle floor and absorbing the manufacturing errors of the vehicle floor by a clearance formed by a sliding contact in the seat rail (for example, see Japanese Unexamined Patent Application Publication No. 2002-116081, hereinafter "Patent Document 2").

The seat-load measuring apparatus 104 disclosed in Patent Document 1 described above is interposed between the seat bracket 106 fixed to the seat mounting section 107 of the vehicle body and the seat rail 103, assembly stress may be produced in the seat-load measuring apparatus 104 by the influence of the upper surface of the seat mounting section 107 of the vehicle body. When the assembly stress is produced in the seat-load measuring apparatus 104, the seat-load measuring apparatus 104 cannot ensure a sufficient measuring accuracy.

In a case in which a heavy load is imposed on the pin bracket 108 that connects the seat rail 103 and the base 105 of the seat-load measuring apparatus 104, for example, in a vehicle collision, the pin bracket 108 must have a sufficient strength to support the heavy load.

However, in the connecting structure for the seat rail 103 and the base 105 of the seat-load measuring apparatus 104 disclosed in Patent Document 1 described above, only the bracket pin 109 extends through the pin holes 105a and 105b simply provided in the left and right side plates of the base 105 having an upwardly-pointing angular-U shape in cross section and the pin holes 108a and 108b simply provided in the left and right side plates of the pin bracket 108 having a downwardly-pointing angular-U shape in cross section. Therefore, the pin bracket 108 has a limitation of having a sufficient strength. That is, the pin bracket 108 can be increased to some extent by increasing the dimensions of portions 108c and 108d of the pin bracket 108 where the pin holes 108a and 108b are formed (for example, the thicknesses, and the distances from the pin holes 108a and 108b to the outer peripheral edge of the pin bracket 108). However, in such a case in which the dimensions of the portions of the pin bracket 108 having the pin holes 108a and 108b are simply increased, layout restrictions are increased, and mounting flexibility is reduced.

Although a heavy load, for example, in a vehicle collision can be, of course, supported by the connecting structure using the pin bracket 108 disclosed in the above publication, it is desirable to more reliably support such a heavy load without increasing layout restrictions.

In the seat-load measuring apparatus disclosed in Patent Document 2 described above, the seat rail is interposed between the seat-load measuring apparatus and the vehicle floor, and manufacturing errors of the vehicle floor are absorbed by the clearance produced by the sliding contact in the seat rail. This overcomes the problem of an insufficient measuring accuracy in Patent Document 1 described above.

In the seat-load measuring apparatus disclosed in Patent Document 2, however, an operation hole or the like must be formed in the base member, in a manner similar to that in Patent Document 1 described above, and this decreases the strength of the base member.

Although the base member disclosed in Patent Document 2 described above can support a heavy load produced, for example, in a vehicle collision, it is desirable to more reliably support such a heavy load without increasing layout restrictions.

The present invention has been made in view of such circumstances.

SUMMARY OF THE INVENTION

Several exemplary objects of the present invention are to provide a seat-load measuring apparatus that can prevent assembly stress due to the influence of a vehicle body to ensure a sufficient measuring accuracy, that can increase mounting flexibility without increasing layout restrictions, and that can more reliably support a heavy load, for example, in a vehicle collision.

In order to solve the above problems, a seat-load measuring apparatus according to the present invention includes a seat rail fixed to a vehicle body to guide a vehicle seat movably in a vehicle front-rear direction, a base fixed to one of the vehicle seat and the seat rail to support a load imposed on the vehicle seat, a base support means fixed to the other of the vehicle seat and the seat rail to support the base, an arm supported by the base to receive the load imposed on the vehicle seat, a load sensor supported by the arm to detect the load imposed on the vehicle seat, and a load support means provided in at least one of the base and the base support means to support a load heavier than a predetermined load imposed on the vehicle seat. The load imposed on the vehicle seat is measured by the load sensor.

In the seat-load measuring apparatus having such features according to the present invention, the load sensor is supported by the base with the arm therebetween, and the load imposed on the vehicle seat is detected by the load sensor through the arm.

When a load is imposed on the seat rail in normal cases, since the load is relatively light, it is supported by the base and the base support means. In contrast, when a relatively heavy load is imposed, for example, in a vehicle collision, it is supported by the load support member.

Since the load imposed on at least one of the base and the base support means due to a heavy load produced, for example, in a vehicle collision is thus dispersed and supported by the load support means and at least one of the base and the base support means having the load support means, at least one of the base and the base support means having the load support means has a sufficient strength to withstand such a heavy load. Consequently, it is unnecessary to increase the strength of at least one of the base and the base support means having the load support means. As a result, the dimensions of at least one of the base and the base support means do not need to be increased.

Therefore, at least one of the base and the base support means can be made compact, layout restrictions are lightened, and mounting flexibility is increased.

Since the seat rail is interposed between the seat-load measuring apparatus and the vehicle body, even when there is a possibility that assembly stress will be produced in the seat-load measuring apparatus by the influence of the vehicle body, the assembly stress is absorbed by the clearance formed in the sliding contact portion between the upper and lower rails of the seat rail. Therefore, the influence of the vehicle body on the seat-load measuring apparatus is reduced, and a sufficient measuring accuracy of the seat-load measuring apparatus is ensured.

In this way, the seat-load measuring apparatus of the present invention is made compact to effectively lighten layout restrictions and to increase mounting flexibility, sufficiently supports a heavy load, and ensures a sufficient measuring accuracy without any influence of the vehicle body.

It is to be understood that both the foregoing general description and the following detailed description are exemplary and explanatory only, and are not restrictive of the invention as claimed.

BRIEF DESCRIPTION OF DRAWINGS

These and other features, aspects, and advantages of the present invention will become apparent from the following description, appended claims, and the accompanying exemplary embodiments shown in the drawings, which are briefly described below.

DETAILED DESCRIPTION

An embodiment of the present invention will be described below with reference to the drawings. Throughout the description, "front, rear, left, right, upper, and lower" sides refer to "front, rear, left, right, upper, and lower" sides of a vehicle.

Figure 1:
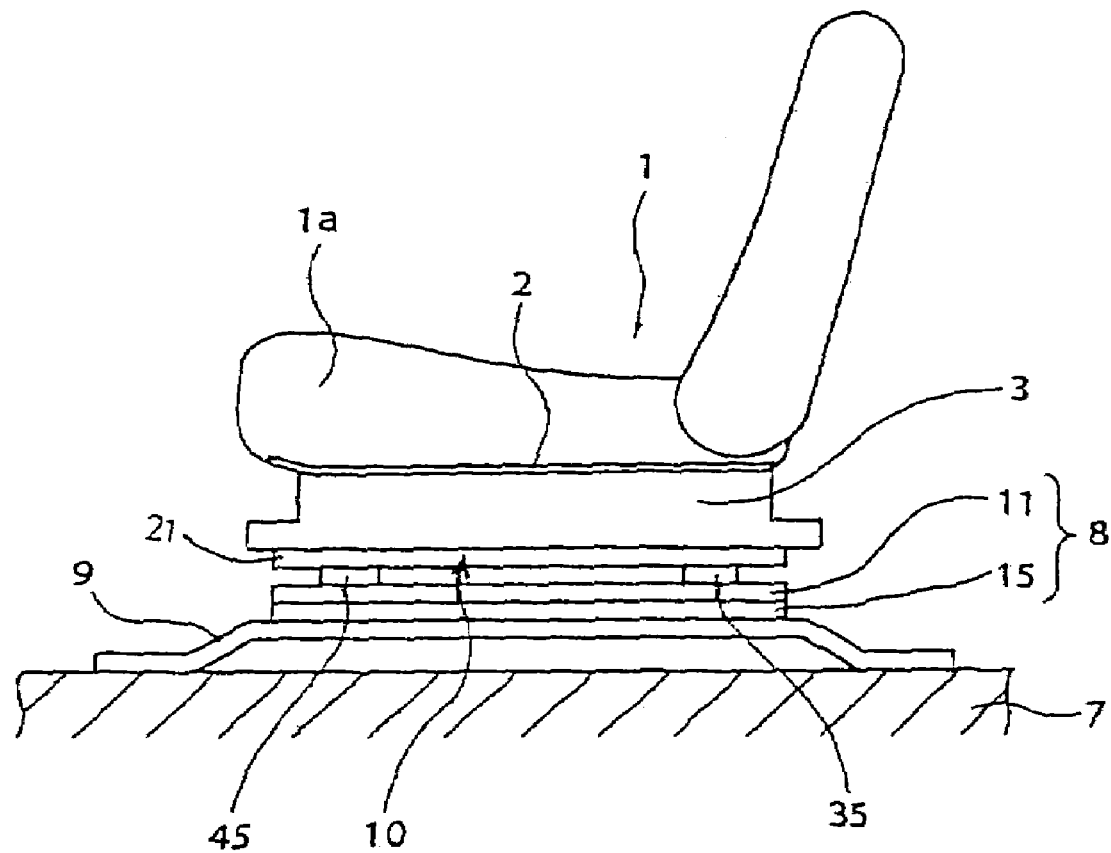
FIG. 1 is side view of a vehicle seat to which an embodiment of a seat-load measuring apparatus according to the present invention is applied.

As shown in FIG. 1, a seat pan 2 made of a steel plate is provided under a seat cushion 1a of a vehicle seat 1 on which a passenger sits so as to cover the entire lower surface of the seat cushion 1a. A pair of side frames 3 (only the left side frames is shown in FIG. 1) hang under the seat pan 2 with a predetermined space therebetween in the vehicle right-left direction. These side frames 3 extend in the front-rear direction of the vehicle.

Seat-load measuring apparatuses 10 (only the left seat-load measuring apparatuses is shown in FIG. 1) are provided at the lower ends of the side frames 3 with a pair of front and rear mounting brackets 45 and 35 extending in the vehicle right-left direction therebetween. Base frames or base 21 of the seat-load measuring apparatuses 10 are connected to the pair of front and rear mounting brackets 45 and 35. Seat rails 8 (only the left seat rail is shown in FIG. 1) are respectively provided at the lower ends of the side base frames 21. The seat rails 8 substantially have the same structure as that of known seat rails, and each of the seat rails 8 includes an upper rail 11 fixed at the lower end of the base frame 21, and a lower rail 15 connected to the upper rail 11 so as to slide relative to the upper rail 11 in the vehicle front-rear direction, and guides the vehicle seat 1 to move in the vehicle front-rear direction. In this case, although not shown, a small clearance is formed in a sliding contact portion between the upper rail 11 and the lower rail 15.

The lower surfaces of the lower rails 15 are fixed to a pair of seat brackets 9 (only the left seat brackets 9 is shown in FIG. 1) that are fixed on a body floor 7 with a predetermined space therebetween in the vehicle right-left direction. Such fixing of the seat brackets 9 to the vehicle body allows the vehicle seat 1 to be stably supported by the vehicle body, and allows the load to the vehicle seat 1 to be more precisely detected by load sensors 51. The lower rails 15 may be directly fixed to the body floor 7 without the seat brackets 9 therebetween.

Figure 2:
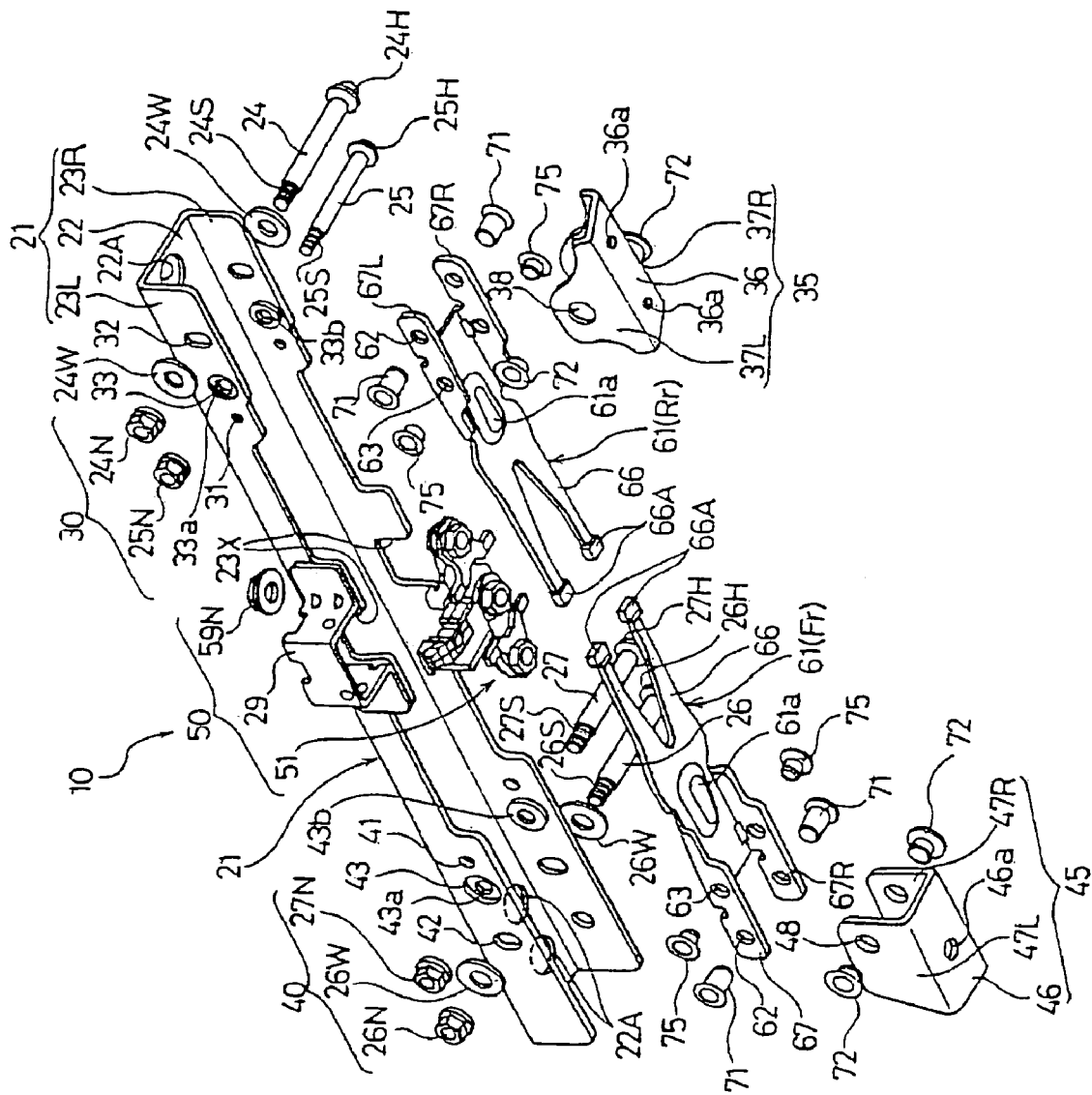
FIG. 2 is an exploded perspective view of the embodiment of the seat-load measuring apparatus according to the present invention.
Figures 8A, 8B:
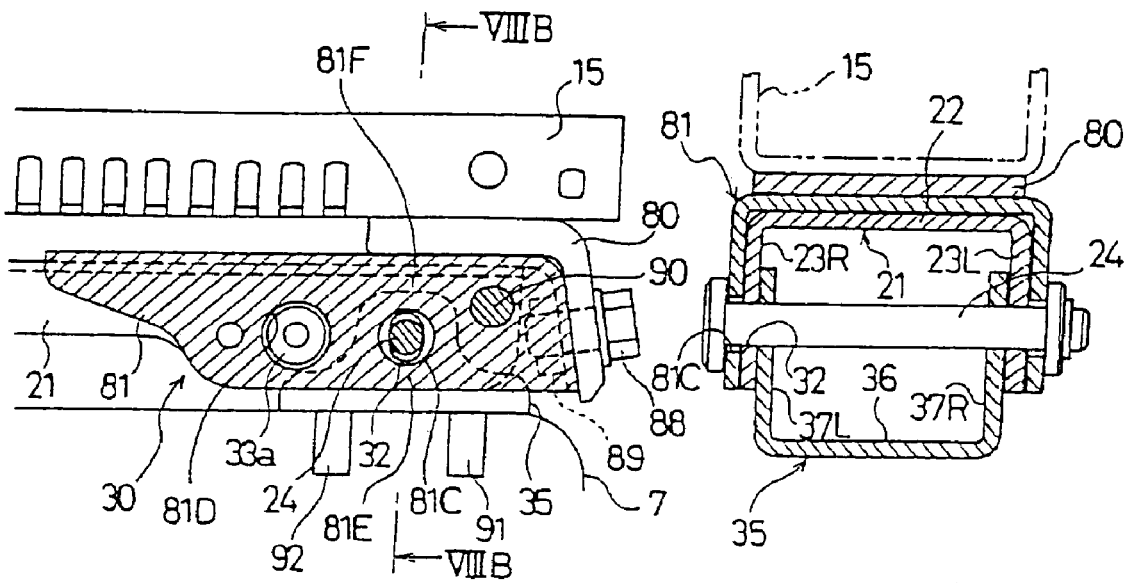
FIGS. 8(A) and 8(B) are right side and front view, respectively, of a base bracket according to embodiment of the present invention.

As shown in FIGS. 2 and 3, each seat-load measuring apparatus 10 includes a base frame 21 extending in the vehicle front-rear direction, and the base frame 21 is composed of a base bottom 22 and left and right side walls 23L and 23R and has a downward-pointing (open at the bottom) angular U-shape in transverse section. The base frame 21 also has mounting sections 40 and 30 to be mounted to the vehicle body or the lower rail 15 at the front and rear ends thereof. As shown in FIG. 8(A), a base bracket 81 is provided in the mounting section 30 at the rear end of the base frame 21. The base bracket 81 includes a bottom portion 81A and left and right side walls 81L (81R) made of a belt-shaped plate, and has a downward-pointing (open at the bottom) angular U-shape in transverse section, and has a rear-end wall 81B. In this case, the base bracket 81 is L-shaped in cross section in the vehicle front-rear direction by the bottom portion 81A and the rear-end wall 81B.

The base bracket 81 is disposed in the mounting section 30 at the rear end of the base frame 21 and is fixed by a rivet 90 so that the inner surfaces of the bottom portion 81A and the left and right side walls 81L (81R) cover the outer surfaces of the base bottom 22 and the left and right base side walls 23L and 23R of the base frame 21 in contact therewith. A rear-rail mounting member 80 of L-shaped transverse section is fixed to the side frame 3. The rear-rail mounting member 80 is fixed to the rear-end wall 81B of the base bracket 81 by a bolt 88 and a nut 89 in a state in which the inner surface of the rear-rail mounting member 80 is in contact with the outer surfaces of the bottom portion 81A and the rear-end wall 81B of the base bracket 81. In this way, the side frame 3 and the base frame 21 are fixedly connected, and the base frame 21 is provided on a side of the seat cushion 1 a remote from the vehicle body.

The rear-rail mounting member 80 and the lower rail 15 may be integrally made of a single member. Although not shown, a front-rail mounting member having the same shape as that of the rear-rail mounting member 80, extending in the vehicle right-left direction, and having an L-shaped transverse section is provided at the front end of the lower surface of each lower rail 15. The front-rail mounting member is oriented opposite to the rear-rail mounting member 80 in the vehicle front-rear direction.

A sensor section 50 is provided at the center of the base frame 21 in the vehicle front-rear direction. A description will be given of the sensor section 50. At the rear end of the base frame 21, slots 32, pivot holes 33, and small holes 31 are bored through the rear end portions of the left and right base side walls 23L and 23R so as to oppose each other.

The slots 32 vertically extend, and a stopper bolt (corresponding to the stopper pin in the present invention) 24 is passed through the slots 32, as shown in FIGS. 2, 3(A), 3(B), and 7(A). The stopper bolt 24 is a pivot support pin that pivotally supports and connects the rear mounting bracket 35 and a Z-arm 61Rr, and serves to transmit a seat load shown by an empty arrow in FIG. 3(B) to the Z-arm 61Rr. The stopper bolt 24 has a hexagonal head portion 24H at one end and a screw portion 24S at the other end, and is shaped like a cylinder having a smooth peripheral surface at the center. After the stopper bolt 24 is passed through the slots 32, it is fixed by a stopper nut 24N with a stopper washer 24W therebetween.

Figure 7A:
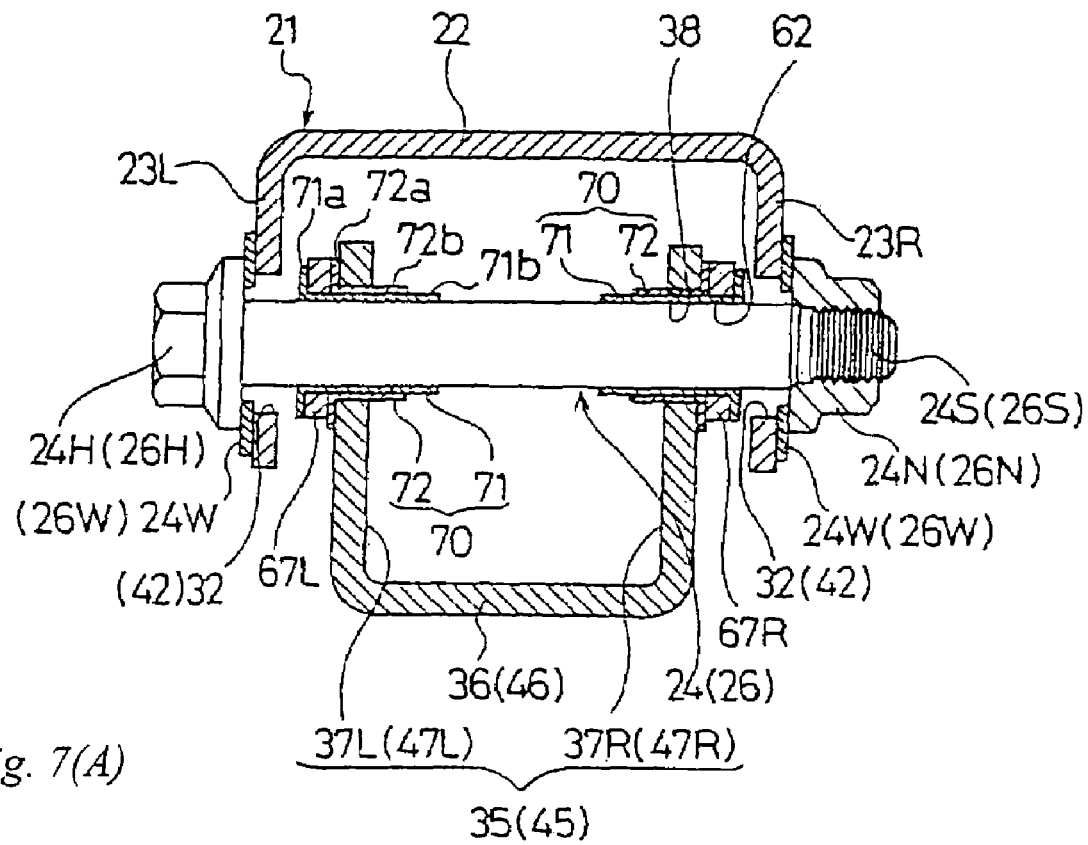
FIG. 7(A) is an enlarged sectional view of a bolt mounting section in the seat-load measuring apparatus of this embodiment, taken along the axis of a front stopper bolt.

In an assembled state shown in FIGS. 7(A), 8(A), and 8(B), gaps are formed between the outer peripheral surface of the stopper bolt 24 and the inner peripheral rims of the slots 32, and therefore, the stopper bolt 24 normally does not touch the inner rims of the slots 32. When the base frame 21 is raised by a relatively light load imposed on the vehicle seat 1 in normal cases, the lower rims of the slots 32 touch the stopper bolt 24, and the load is sufficiently supported by the base side walls 23L and 23R of the base frame 21. The load is directly transmitted from the base side walls 23L and 23R of the base frame 21 to the rear mounting bracket 35, and does not act on a load sensor (a sensor plate 52 and so on; this will be described in detail later) 51. When the base frame 21 is pushed down by the force applied to a seat belt, the upper rims of the slots 32 touch the stopper bolt 24, and an action similar to the above is produced.

Figure 7B:
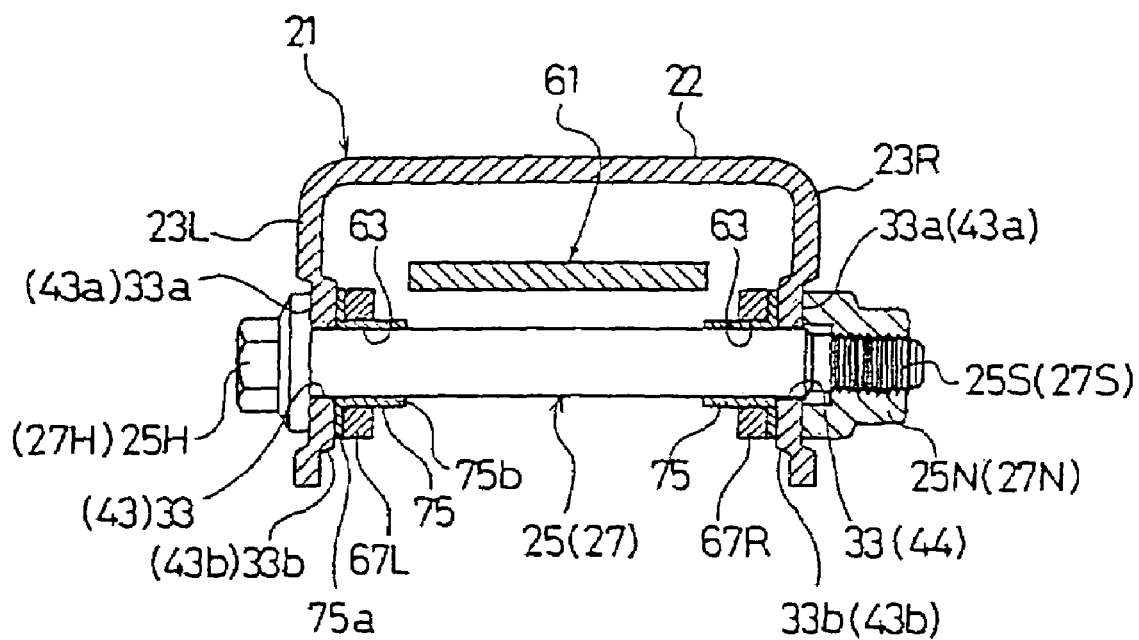
FIG. 7(B) is an enlarged sectional view of the bolt mounting section, taken along the axis of a pivot bolt.

Although the base bracket 81 is not shown in FIGS. 7(A) and 7(B), in this embodiment, the bottom portion 81A of the base bracket 81 is disposed on the upper surface of the base bottom 22 of the base frame 21, and both the side walls 81L and 81R are disposed between the base side walls 23L and 23R, and the head portion 24H of the bolt 24 and the nut 24N (more specifically, between the base side walls 23L and 23R and the washer 24W) on the side of the bolt 24, and are disposed on the outer sides of the base side walls 23L and 23R on the side of a bolt 25, as shown in FIGS. 8(A) to 8(D).

As shown in FIG. 2, the pivot holes 33 are bored in the base side walls 23L and 23R adjacent to the slots 32 offset toward the center. Annular counterbored portions 33a are provided around the pivot holes 33 on the outer sides of the base side walls 23L and 23R, and annular projecting portions 33b are provided on the inner sides of the base side walls 23L and 23R. A pivot bolt (pivot support pin) 25 is passed through the pivot holes 33, as shown in FIGS. 2, 3(A), 3(B), and 7(B). The pivot bolt 25 is a pivot support pin that supports the Z-arm 61Rr to pivot relative to the base frame 21. When a seat load is imposed on the Z-arm 61Rr through the stopper bolt 24, as shown by an empty arrow in FIG. 3(B), the Z-arm 61Rr pivots on the pivot bolt 25. The pivot bolt 25 has a hexagonal head portion 25H at one end and a screw portion 25S at the other end, and is shaped like a cylinder having a smooth peripheral surface at the center. After the pivot bolt 25 is passed through the pivot holes 33, it is fixed by a pivot nut 25N.

The left and right side walls 81L and 81R of the base bracket 81 have through holes 81C through which the stopper bolt 24 extends, and through holes 81D through which the pivot bolt 25 extends. As shown in FIGS. 7(A), 8(A), and 8(B), the through holes 81C are disposed to be concentric with the slots 32 in a state in which the base bracket 81 is attached to the base frame 21. In such a state in which the through holes 81C are concentric with the slots 32, the upper rims of the through holes 81C are slightly higher than the upper rims of the slots 32, and the lower rims of the through holes 81C are slightly lower than the lower rims of the slots 32.

Figures 8C, 8D:
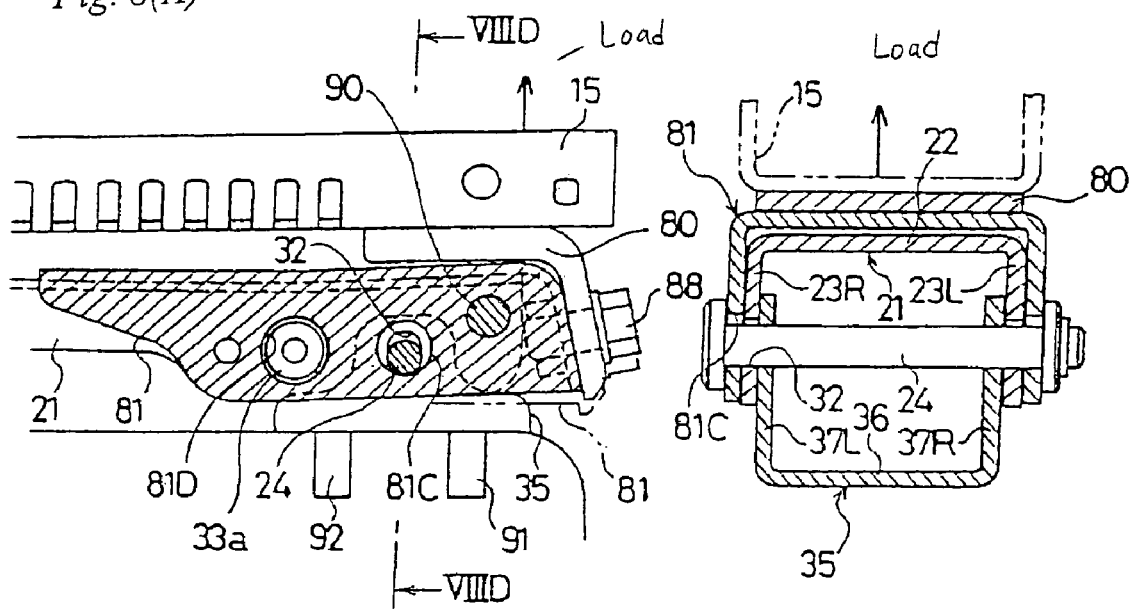
FIGS. 8(C) and 8(D) are right side and front view, respectively, of the base bracket of FIGS. 8(A) and 8(B) when a load is applied to the bracket.

When a load heavier than in a normal case is imposed on the vehicle seat 1, for example, by a vehicle collision, the base frame 21 is raised by the heavy load, the lower rims of the slots 32 touch the stopper bolt 24, and only the base bracket 81 is then raised, so that the lower rims of the through holes 81C immediately touch the stopper bolt 24, as shown in FIGS. 8(C) and 8(D). Consequently, the heavy load is supported by the base side walls 23L and 23R of the base frame 21, as described above, and is also sufficiently supported by the side walls 81L and 81R of the base bracket 81. Therefore, portions of the base bracket 81 lower than the lower rims of the through holes 81C constitute a load support mechanism 81E. Since the heavy load is supported in a dispersed manner by the base side walls 23L and 23R and the side walls 81L and 81R in this way, a load imposed on the base side walls 23L and 23R of the base frame 21 by the heavy load is reduced.

When the base frame 21 is pushed down by the force applied to the seat belt, after the upper rims of the slots 32 touch the stopper bolt 24, the upper rims of the through holes 81C immediately touch the stopper bolt 24, and an action similar to the above is produced. In this case, portions of the base bracket 81 higher than the upper rims of the through holes 81C constitute a load support mechanism 81F.

Accordingly, it is unnecessary to increase the strength of the load support mechanism (portions of the base side walls 23L and 23R lower and higher than the slots 32) in the base side walls 23L and 23R of the base frame 21. As a result, it is also unnecessary to increase the thicknesses of the portions of the base side walls 23L and 23R at the slots 32, the dimensions between the slots 32 to the lower edges of the base side walls 23L and 23R, and the like.

Since the base frame 21 can be thereby made compact, layout restrictions can be lightened, and mounting flexibility can be increased.

Moreover, since the above-described heavy load can be supported by the base bracket 81 made of a belt-shaped plate, the heavy load can be reliably supported with a simple structure.

Since the stopper bolt 24 and the pivot bolt 25 are fastened by the stopper nut 24N and the pivot nut 25N, they can be mounted easily and reliably.

The small holes 31 are provided adjacent to the pivot holes 33, and function as service holes through which the mounting condition is checked.

Figure 3A:
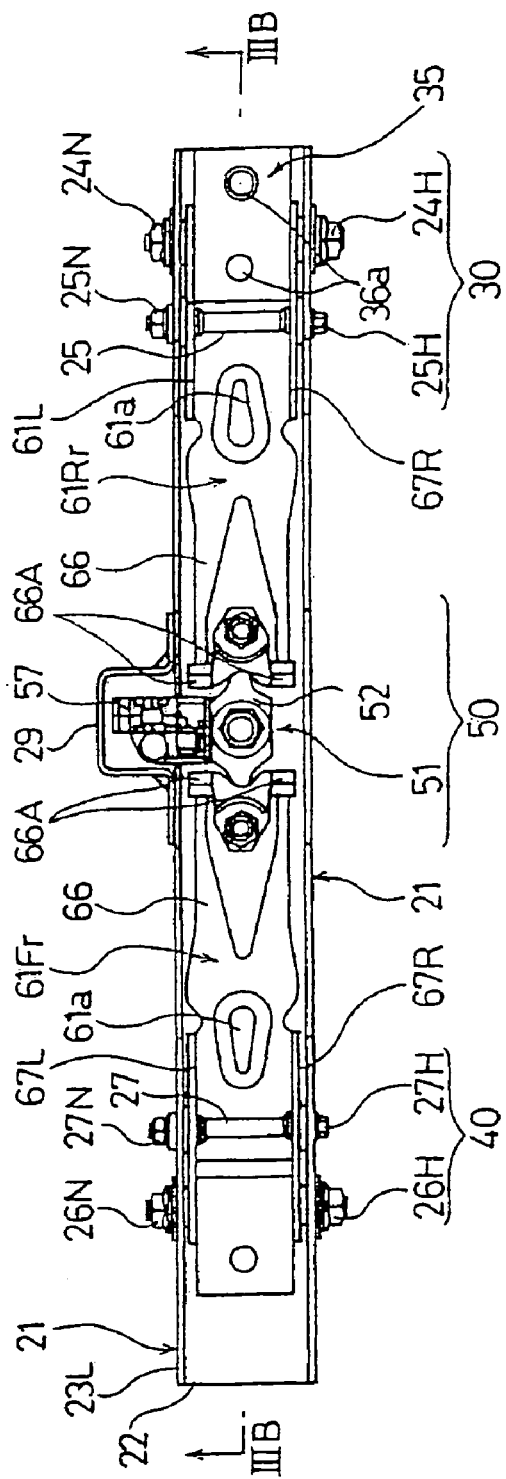
FIG. 3(A) is a plan view of the seat-load measuring apparatus of this embodiment in an assembled state.
Figure 3B:
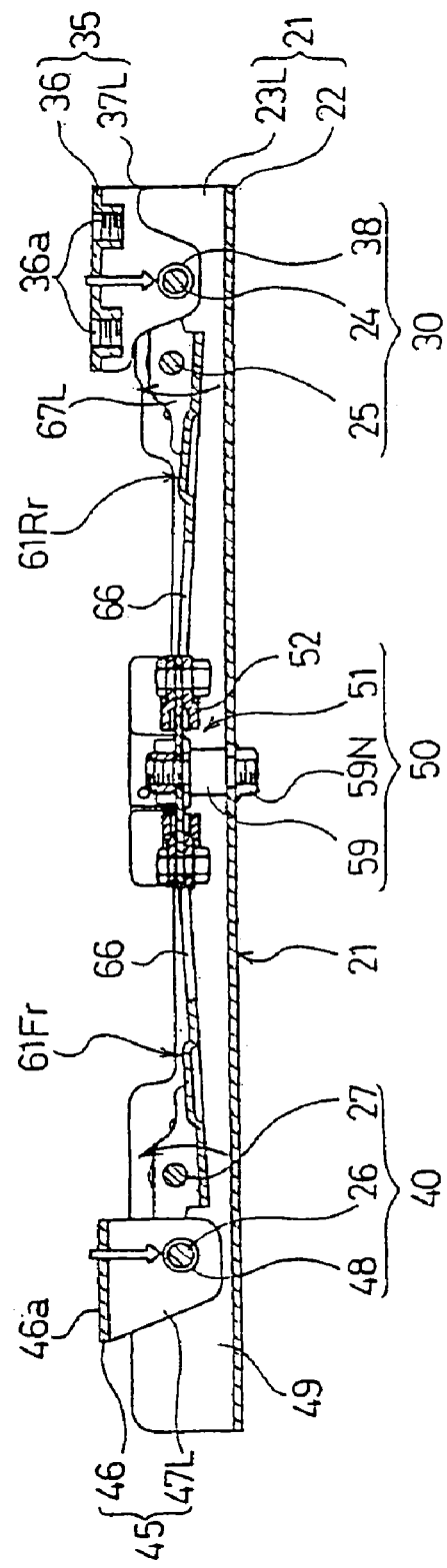
FIG. 3(B) is a cross-sectional view, taken along line IIIB—IIIB in FIG. 3(A).

As shown in FIGS. 2, 3(A), and 3(B), the Z-arm 61Rr is disposed inside the base frame 21 in the mounting section 30 at the rear end. In plan view, the Z-arm 61Rr has a flat bifurcated portion 66, which bifurcates in the right and left directions, between the center and the front end, and has arm side walls 67L and 67R standing upward on the left and right sides at the rear end. As shown in FIGS. 3(A), 3(B), 7(A), and 7(B), the Z-arm 61Rr is mounted along the inner sides of the base side walls 23L and 23R. Gaps are provided between the arm side wall 67L and the base side wall 23L and between the arm side wall 67R and the base side wall 23R, and flange portions of sleeves 70 (71, 72) and 75 which will be described later are disposed in the gaps.

As shown in FIG. 2, the left and right side walls 67L and 67R of the Z-arm 61Rr are also provided with holes 62 and 63 bored at the positions corresponding to the slots 32 and the pivot holes 33 of the base side walls 23L and 23R. As shown in FIGS. 2, 3(A), 3(B), 7(A), and 7(B), the stopper bolt 24 extends through the holes 62 (holes corresponding to the slots 32 of the base frame 21) provided near the rear end of the Z-arm 61Rr, and the pivot bolt 25 extends through the holes 63 (holes corresponding to the pivot holes 33 of the base frame 21) provided near the center of the Z-arm 61Rr.

As is evident from the above, the stopper bolt 24 principally serves to pivotally connect the mounting bracket 35 and the Z-arm 61Rr, as shown in FIG. 3(B), and to transmit the seat load to the Z-arm 61Rr. In this case, since the gaps are formed at the slots 32 between the stopper bolt 24 and the base frame 21, as described above, the stopper bolt 24 and the base frame 21 do not interfere with each other in normal cases. The pivot bolt 25 principally serves to support the Z-arm 61Rr to pivot relative to the base frame 21. Therefore, the Z-arm 61Rr pivots on the pivot bolt 25.

An inner space of the bifurcated portion 66 of the Z-arm 61Rr is narrow near the center. As shown in FIGS. 2, 3(A), and 3(B), a raised portion 61a is provided at the center of the Z-arm 61Rr, and increases the strength of the Z-arm 61Rr. Both leading-end (rear-end) acting portions of the bifurcated portion 66 are covered with resin arm caps 66A. These arm caps 66A are sandwiched between wing portions 53a and 55a of upper and lower half arms 53 and 55 (shown in FIG. 5(B)) in the load sensor 51 (details thereof will be described later). These arm caps 66A minimize the noise produced by the contact between the leading-end acting portions of the Z-arm 61Rr and the wing portions 53a and 55a of the half arms 53 and 55. Consequently, the passenger sitting on the vehicle seat 1 will not feel uncomfortable.

When a load is imposed on the baser frame 21, the Z-arm 61Rr slightly pivots, and the leading-end acting portions transmit the load to the sensor plate 52 through the half arms 53 and 55.

As shown in FIGS. 7(A), 8(A), and 8(B), when the rear-rail mounting member 80 fixed to the side frame 3, the base bracket 81 fixed to the base frame 21, and the rear mounting bracket 35 are assembled, the stopper bolt 24 is passed through the holes 38, the slots 32, and the holes 81C. In this case, double sleeves 70 (71, 72) are interposed between the outer peripheral surface of the stopper bolt 24, and the inner peripheral surfaces of the holes 38 of the rear mounting bracket 35 (the double sleeves 70 are not shown in FIGS. 8(A) and 8(B)).

Figure 9:
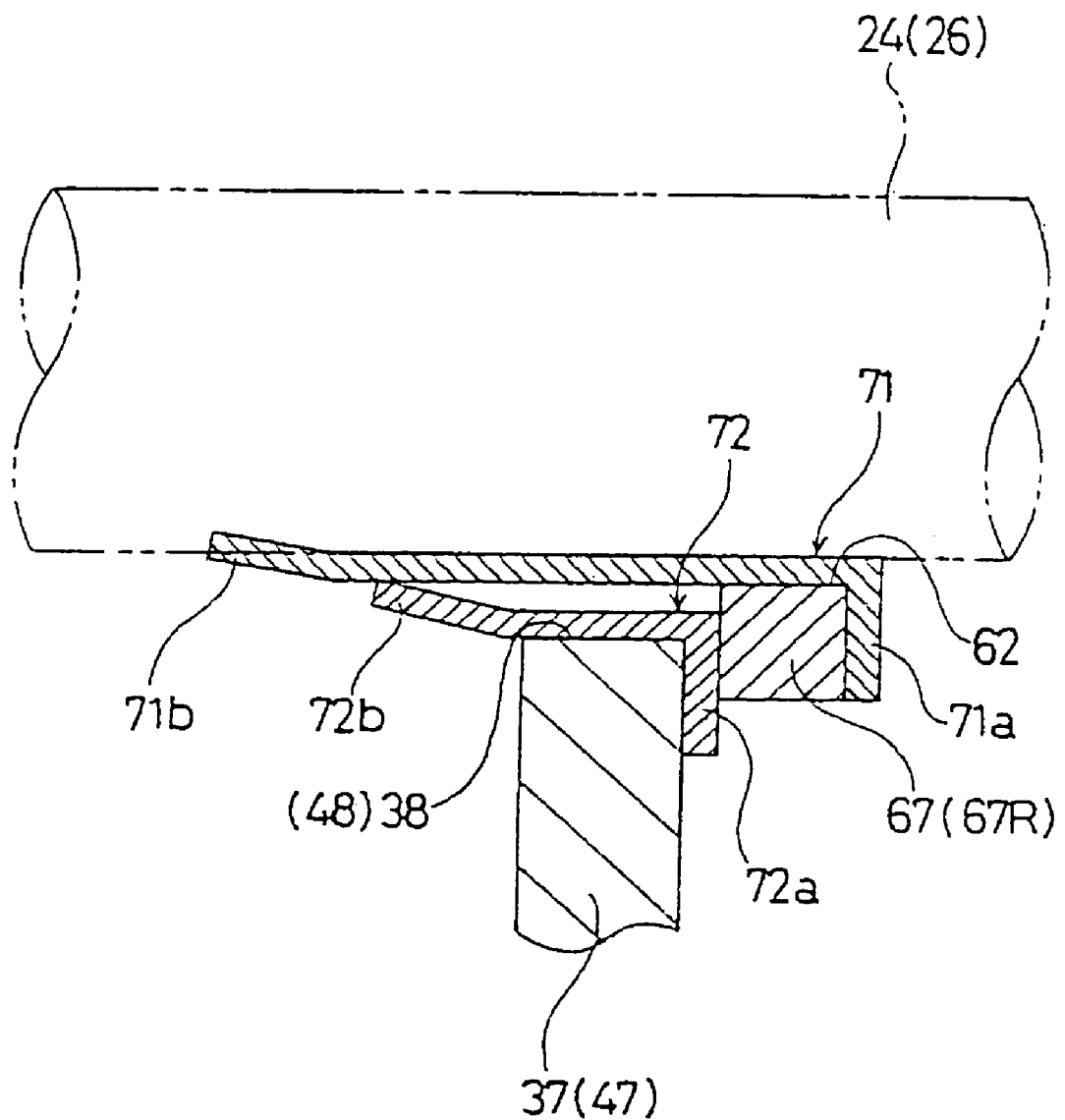
FIG. 9 is an enlarged sectional view showing the adjacency of a double sleeve in the seat-load measuring apparatus in this embodiment.
Figure 10A:
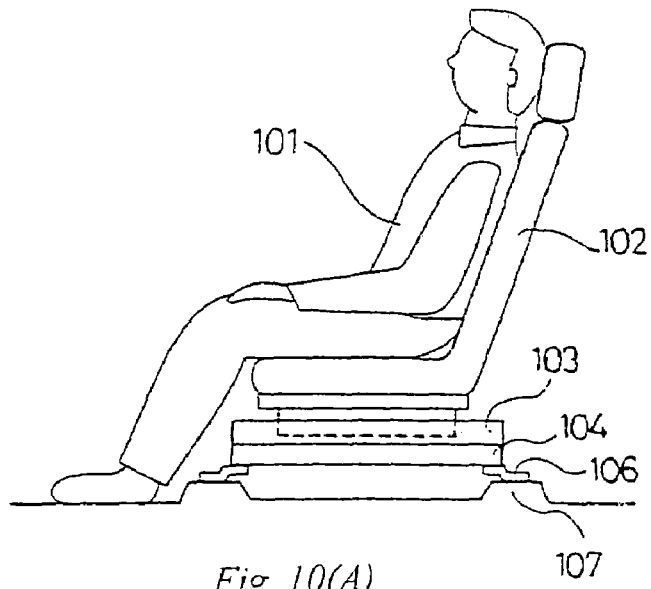
FIG. 10(A) is a view showing a conventional seat-load measuring apparatus disclosed in Japanese Unexamined Patent Application Publication No. 2000-258234 in a state in which a person is setting on a vehicle seat.
Figure 10B:
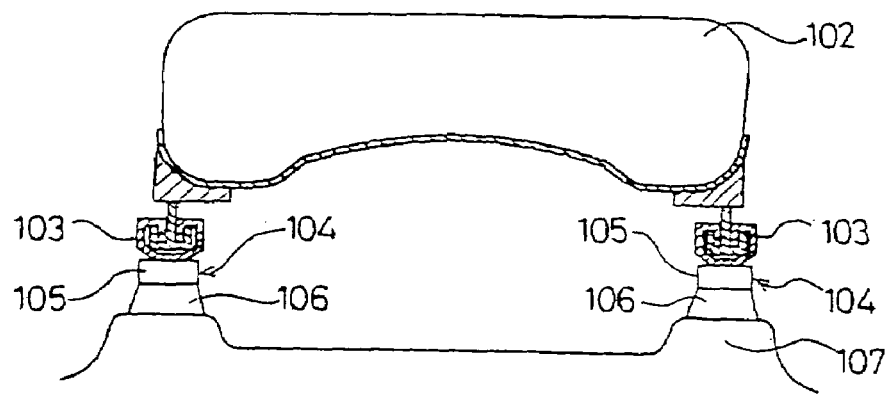
FIG. 10(B) is a sectional view showing a mounting state of the seat-load measuring apparatus.
Figure 10C:
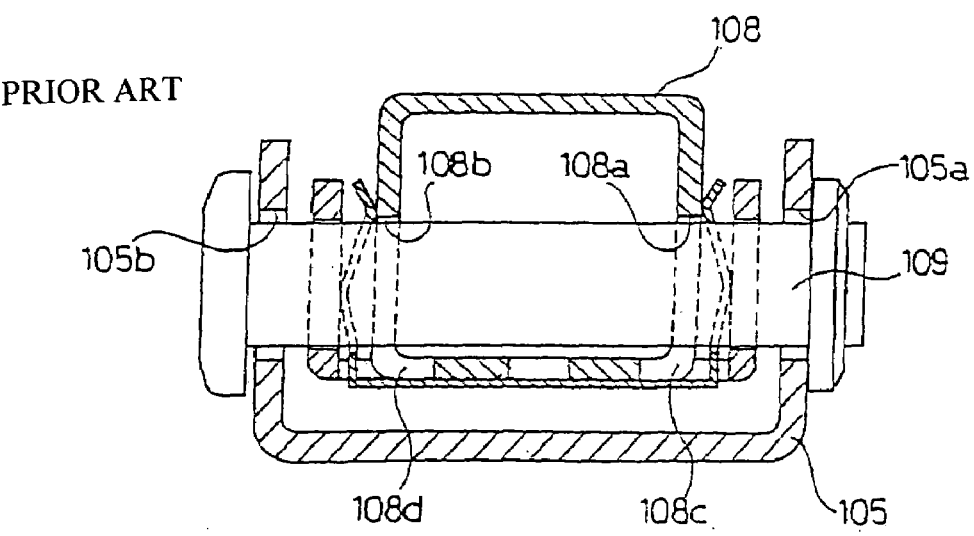
FIG. 10(C) is a detailed sectional view showing the mounting of the seat-load measuring apparatus.

That is, as shown in FIGS. 7(A) and 9, the double sleeves 70 are fitted around the cylindrical portion of the stopper bolt 24, and each of the double sleeves 70 includes a relatively long inner sleeve 71 and a relatively short outer sleeve 72 fitted on the inner sleeve 71. The sleeves 71 and 72 respectively have flange portions 71a and 72a at one end, and tapered portions 71b and 72b at the other end (shown in FIG. 9). The inner surfaces of the sleeves 71 and 72 and the end faces of the flange portions 71a and 72a are coated with Teflon (registered trademark). In FIG. 9, the inclinations of the tapered portions 71b and 72b are exaggerated.

The inner sleeves 71 of the double sleeves 70 are fitted between the shaft portion of the stopper bolt 24, and the holes 62 of the arm side walls 67L and 67R and the holes 38 of the rear mounting bracket 35. The outer sleeves 72 are press-fitted between the outer peripheral surfaces of the inner sleeves 71 and the holes 38 of the rear mounting bracket 35. The flange portions 72a of the outer sleeves 72 are interposed between the arm side walls 67L and 67R and the trapezoidal side walls 37L and 37R of the rear mounting bracket 35 (shown only by reference number 37 in FIG. 9). The flange portions 71a of the inner sleeves 71 are disposed along the outer sides of the arm side walls 67L and 67R.

Next, the relationship between the double sleeves 70 and the peripheral members, and the operation thereof will be described with reference to FIG. 9.

The outer peripheral portions of the inner sleeves 71 are press-fitted in the holes 62 of the arm side walls 67L and 67R, so that the inner sleeves 71 will not rattle inside the holes 62. Between the inner sleeves 71 and the stopper bolt 24 fitted in the inner holes of thereof, the tapered portions 71b of the inner sleeves 71 elastically touch and hold the outer peripheral surface of the stopper bolt 24. Therefore, the stopper bolt 24 will not rattle inside the inner holes of the inner sleeves 71, although there are gaps between the inner sleeves 71 and the stopper bolt 24 in the portions other than the tapered portions 71b.

Between the outer sleeves 72 and the inner sleeves 71 fitted in the inner holes thereof, the tapered portions 72b of the outer sleeves 72 elastically touch and hold the outer peripheral surfaces of the inner sleeves 71. Therefore, the inner sleeves 71 will not rattle inside the inner holes of the outer sleeves 72, although there are gaps between the outer sleeves 72 and the inner sleeves 71 in the portions other than the tapered portions 72b.

Since gaps that allow the members to rattle are not formed between the side walls 37L and 37R of the rear mounting bracket 35 and the stopper bolt 24 in this way, it is possible to prevent noise from being produced by the rattling of the members when the load applied to the vehicle seat 1 changes. The double sleeves 70 are not always necessary, and may be omitted when rattling rarely occurs.

A description will now be given of the configuration around the pivot bolt 25 serving as the pivot for the Z-arm 61Rr and the rear mounting bracket 35.

As shown in FIG. 7(B), sleeves 75 are fitted around the cylindrical portion of the pivot bolt 25. The sleeves 75 have flange portions 75a at one end, and tapered portions 75b at the other end. The inner surfaces of the sleeves 75 and the end faces of the flange portions 75a are coated with Teflon (registered trademark).

The outer peripheral portions of the sleeves 75 are press-fitted in the holes 63 of the arm side walls 67L and 67R, so that the sleeves 75 will not rattle inside the holes 63. Between the sleeves 75 and the pivot bolt 25 fitted in the inner holes thereof, the tapered portions 75b of the sleeves 75 elastically touch and hold the outer peripheral surface of the pivot bolt 25. Therefore, the pivot bolt 25 will not rattle in the inner holes of the sleeves 75, although there are gaps between the sleeves 75 and the pivot bolt 25 in the portions other than the tapered portions 75b. Consequently, it is possible to prevent noise from being produced by the rattling of the pivot bolt 25 and the Z-arm 61Rr when the load imposed on the vehicle seat 1 changes, in a manner similar to that in the above-described double sleeves 70.

A Z-arm 61Fr disposed inside the front end of the base frame 21 has the same structure as that of the above-described Z-arm 61Rr at the rear end of the base frame 21, and includes a bifurcated portion 66, arm side walls 67L and 67R, and arm caps 66A at leading-end acting portions. As shown in FIGS. 2, 3(A), and 3(B), the Z-arm 61Rr at the rear end of the base frame and the Z-arm 61Fr at the front end of the base frame are disposed symmetrically with respect to the base center.

Figure 6A:
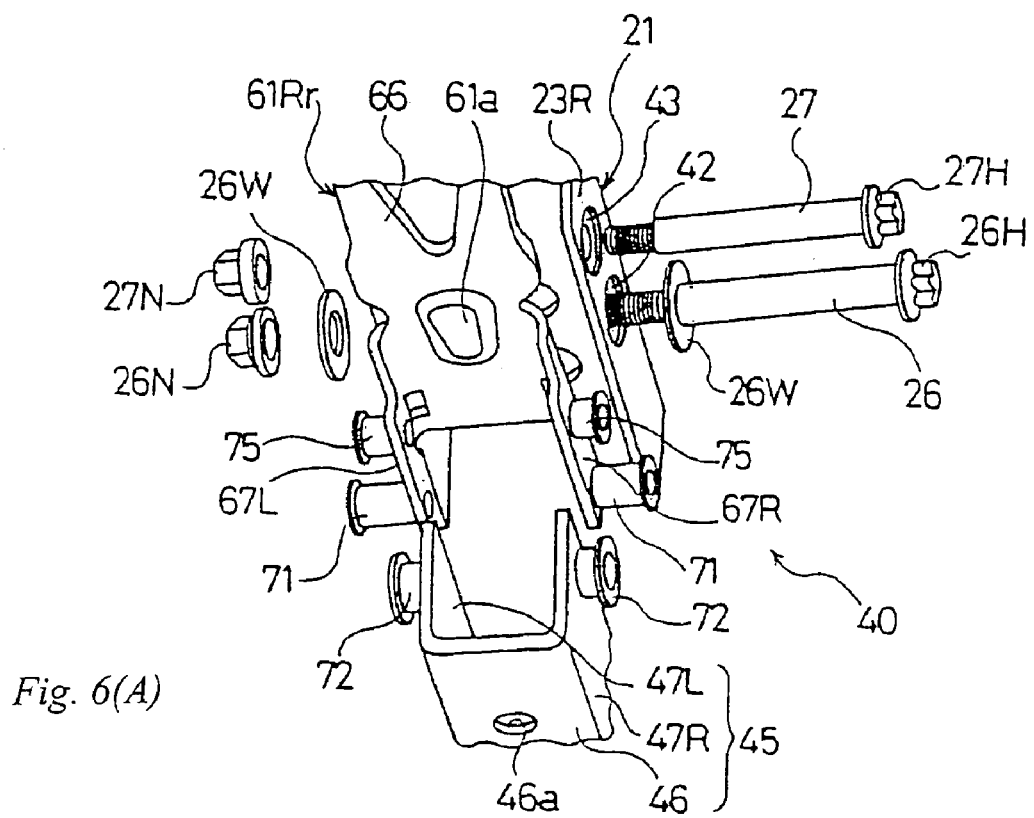
FIGS. 6(A) and 6(B) are an exploded view and an assembly view, respectively, of a rear end section of the seat-load measuring apparatus of this embodiment.
Figure 6B:
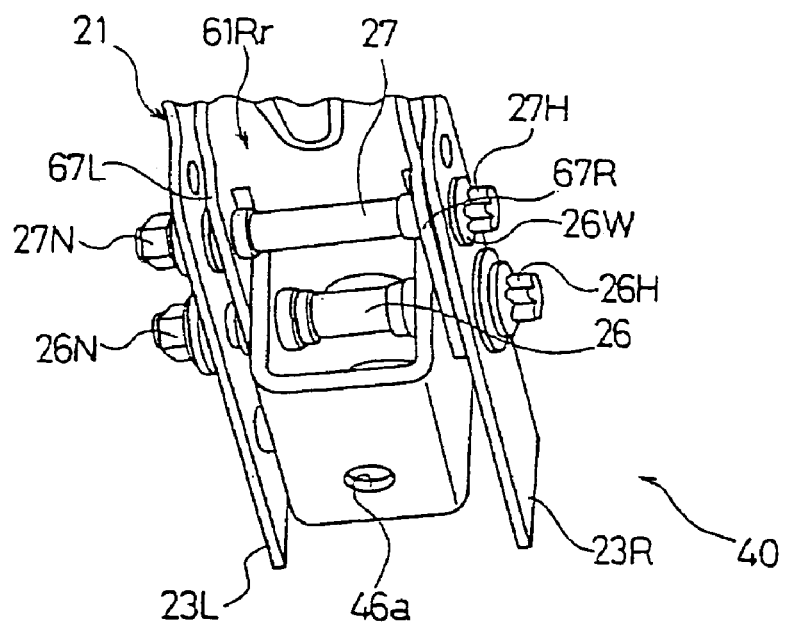

A front mounting bracket 45 is disposed inside the arm side walls 67L and 67R of the Z-arm 61Fr. As shown in FIGS. 2, 6(A), and 6(B), the front mounting bracket 45 has an angular-U shape in transverse section, and includes a flat lower base 46 and side walls 47L and 47R standing from both the left and right ends of the lower base 46. The lower surface of the lower base 46 is fixed to the vehicle floor 7. In this case, the lower base 46 has a hole 46a, and an unillustrated bolt (similar to mounting bolts 91 and 92 of the rear mounting bracket 35 shown in FIGS. 8(A) and 8(B) which will be described later) is passed through the hole 46a. The bolt is screwed in the vehicle floor 7, thereby fixing the front mounting bracket 45 to the vehicle floor 7. Similarly, bolts 91 and 92 are passed through two holes 36a of the rear mounting bracket 35, as shown in FIG. 8(A), and are screwed in the vehicle floor 7, so that the rear mounting bracket 35 is fixed the vehicle floor 7.

The left and right side walls 47L and 47R of the front mounting bracket 45 are substantially trapezoidal, and these side walls 47L and 47R have holes 48 bored at the positions corresponding to slots 42 of the base side walls 23L and 23R. As shown in FIGS. 2, 3(A), 3(B), and 7(A), a stopper bolt 26 extends through the holes 48 (holes corresponding to the slots 42 and holes 62 of the Z-arm 61Fr). As shown in FIGS. 7(A) and 12, double sleeves 70 are fitted between the stopper bolt 26, and the holes 48 of the front mounting bracket 45 and the holes 62 of the Z-arm 61Fr, in a manner similar to that in the above rear mounting bracket 35. In this case, the stopper bolt 26 is loosely fitted in the slots 42 of the base frame 21.

A pivot bolt (pivot support pin) 27 extends through holes 43 and 44 of both the side walls 23L an 23R at the front end of the base frame 21, as shown in FIG. 7(B). Since a method for attaching the pivot bolt (pivot support pin) 27 is the same as that in the above-described pivot bolt 25, a description thereof is omitted.

The load sensor 51 in the sensor section 50 of the base frame 21 will now be described.

As shown in FIG. 2, cutouts 23X are respectively provided in the left and right base side walls 23L and 23R at the longitudinal center of the base frame 21. A protector 29 protruding leftward is fixed to the outer surface of the left base side wall 23L. The load sensor 51 is provided inside the cutouts 23X of the base frame 21 and the protector 29, and is protected by the protector 29.

Figure 5A:
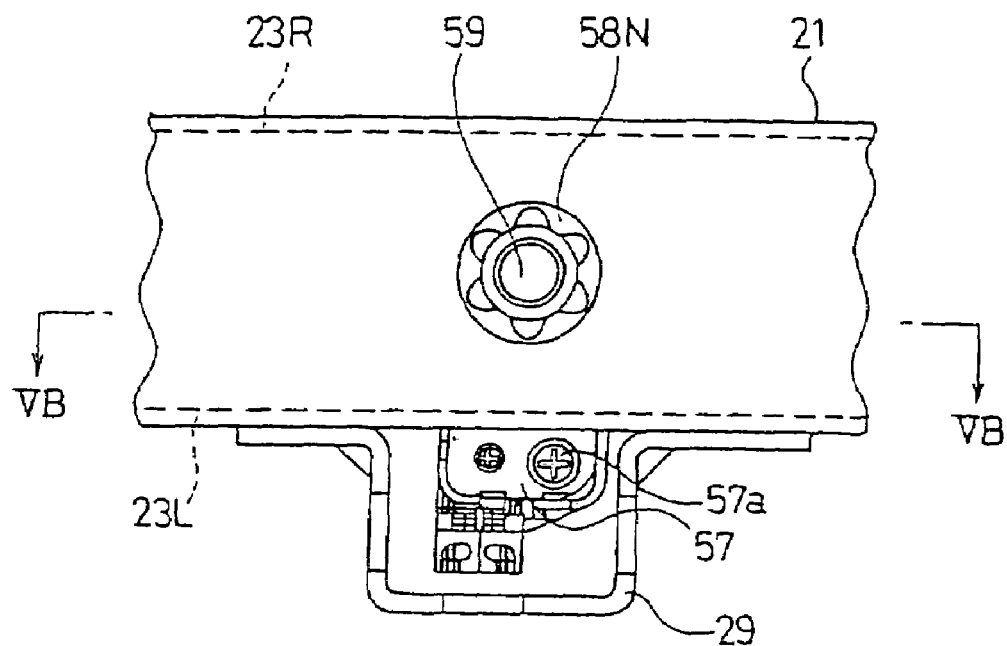
FIG. 5(A) is a plan view showing the sensor section and the surroundings in the seat-load measuring apparatus of this embodiment.
Figure 5B:
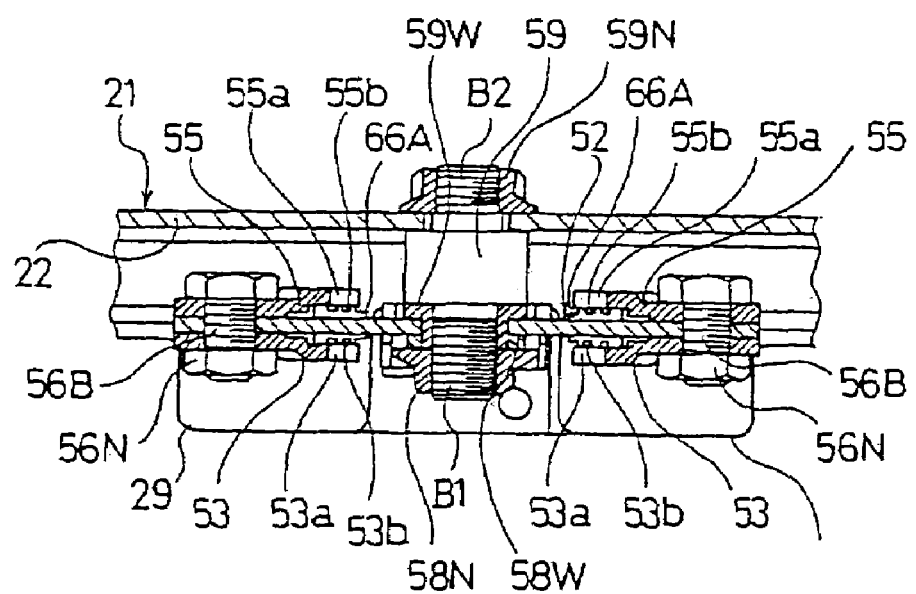
FIG. 5(B) is a cross-sectional view, taken along line VB—VB in FIG. 5(A).

As shown in FIG. 5(B), in a state in which a sensor plate 52, a connector case 57a, and the protector 29 are assembled onto the base frame 21, the lower edge of the protector 29 is lower than the lower surface of the sensor plate 52, the lower surface of the connector case 57a, and the lower surface of a sensor-side connector 57. The upper edge of the protector 29 is higher than the upper surface of the sensor plate 52, the upper surface of the connector case 57a, and the upper surface of the sensor-side connector 57. Accordingly, when the seat-load measuring apparatus 10 and the base frame 21 with the protector 29 are mounted to the vehicle body or the base frame 21 is transported, even if the base frame 21 falls off, the precision components, such as the sensor plate 52 and the connector 57 of the seat-load measuring apparatus 10, can be reliably protected by the protector 29.

In order to more reliably protect the precision components, it is preferable to cover the upper side of the protector 29 with a cover (not shown) because the upper side of the protector 29 is open. While the lower side of the protector 29 is also open, even if foreign matters enter the inside of the protector 29, they are easily discharged therefrom. Therefore, there is no need to cover the lower side of the protector 29 with a cover.

Figure 4:
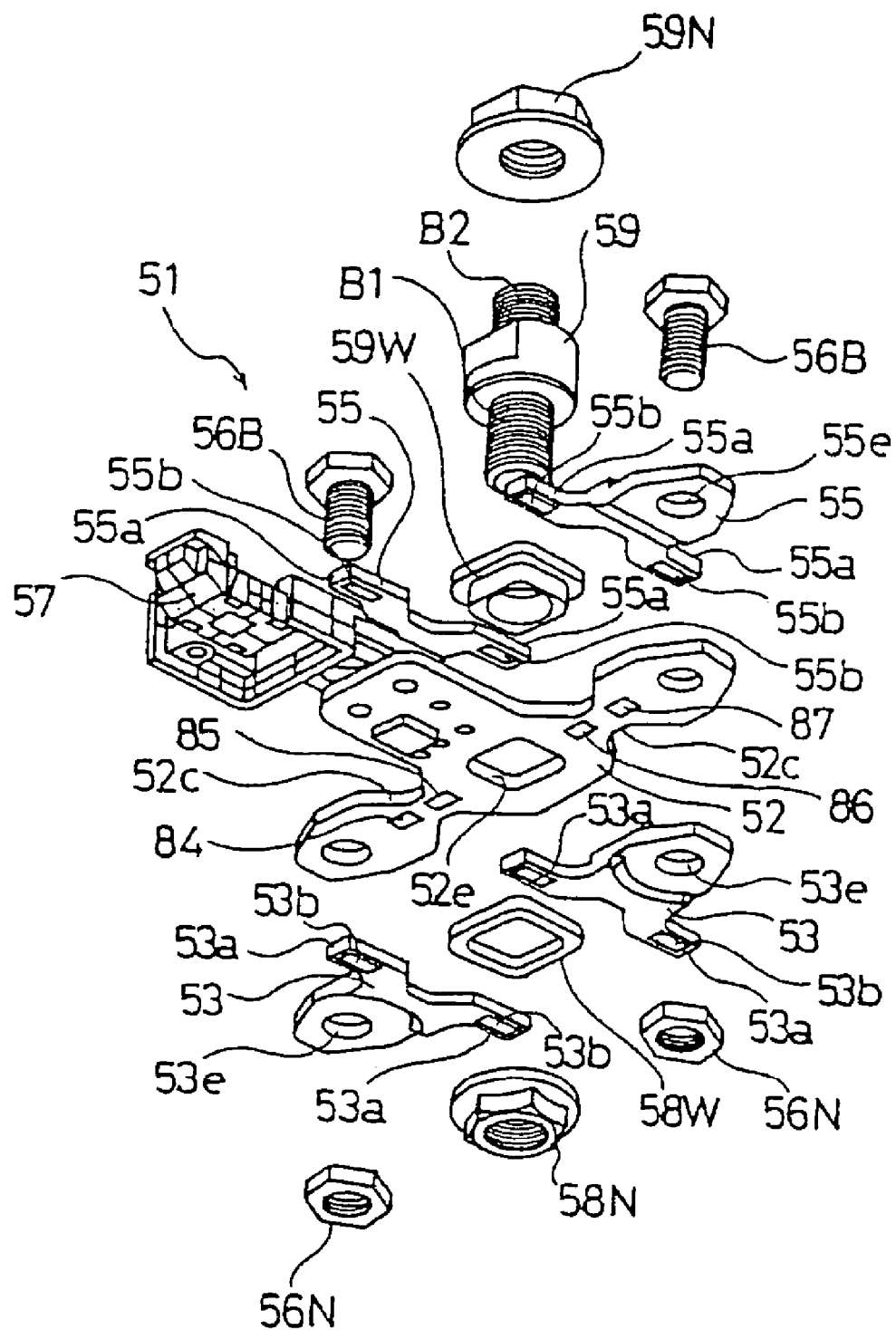
FIG. 4 is an exploded perspective view of a sensor section in the seat-load measuring apparatus of this embodiment.

As shown in FIG. 4, the sensor plate 52 serving as a main component of the load sensor 51 and made of a spring material is shaped like a rectangular plate having two neck portions 52c as a whole. The sensor-side connector 57 is fixed to the left center end of the sensor plate 52 by a screw 57a (shown in FIG. 5(A)). An end of a cable coupled to an electronic control unit (ECU), which is not shown, is connected to the sensor-side connector 57.

An insulating layer for electrical insulation, a wiring layer, and a resistor layer are deposited on the sensor plate 52. In this deposition method, the sensor plate 52 is provided with four strain resistors 84, 85, 86, and 87 serving as strain sensors that constitute the load sensor 51, as shown in FIG. 4. Although not shown, these four strain resistors 84, 85, 86, and 87 are connected to form a well-known type of bridge circuit, and the bridge circuit is connected to the connector 57.

When a seat load is imposed on the sensor plate 52, a strain corresponding to the seat load is produced in the sensor plate 52, and changes the resistances of the four strain resistors 84, 85, 86, and 87. The changes in the strain resistances are detected, and corresponding detection signals are transmitted to the ECU. The ECU finds the strain of the sensor plate 52, that is, the seat load by calculating the resistance changes based on the detection signals transmitted from the strain resistors. Instead of detecting the strain of the sensor plate 52 based on the strain resistors, for example, the seat load may be found by detecting the deflection of the sensor plate 52 with other detection elements such as a capacitor element and a Hall element.

A structure for mounting the sensor plate 52 to the base bottom 22 will now be described.

As shown in FIG. 5(B), a cylindrical center post 59 having bolts B1 and B2 at the upper and lower ends fixedly hangs at the longitudinal center of the base bottom 22. The upper bolt B2 of the center post 59 extends through the base bottom 22, and is screwed in a center nut 59N. The lower bolt B1 of the center post 59 extends through a center hole 52e (shown in FIG. 4) of the sensor plate 52 through a center washer 59W, and is fixed by a center nut 58N through a washer 58W. The center of the sensor plate 52 is firmly fixed to the base bottom 22 of the base frame 21 with the center post 59 therebetween.

The description of the structure of the load sensor 51 will be continued.

Half arms 53 and 55 are assembled to the front and rear ends of the sensor plate 52. As shown in FIGS. 4 and 5(B), these half arms 53 and 55 are four front, rear, upper, and lower components, and are mounted to vertically sandwich the front and rear ends of the sensor plate 52. Since the half arms 53 and 55 have the same shape, a description will be given only of the upper half arms 55.

As shown in FIG. 4, each half arm 55 is shaped like a rectangular plate, and has a mounting hole 55e bored at the base center thereof. A wing portion 55a protruding to the both sides in the lateral direction is provided at an end of the half arm 55 near the center. A bank-shaped fulcrum 55b extending in the right-left direction is provided on the back side of the wing portion 55a. The leading end of the fulcrum 55b is shaped like a slightly pointed edge.

A description will now be given of a structure for assembling the upper and lower half arms 53 and 55, the sensor plate 52, and the acting portions (arm caps 66A) of the Z-arm 61.

As shown in FIG. 5(B), the base portions of the upper and lower half arms 53 and 55 are fixed in tight contact with the surfaces of the sensor plate 52 by bolts 56B and nuts 56N. The wing portions 53a and 55a of the upper and lower half arms 53 and 55 face each other with the fulcrums 53b and 55b opposing each other. The arm caps 66A of the Z-arm acting portions are held between the fulcrums 53b and 55b. The fulcrums 53b and 55b are positioned corresponding to the neck portions 52c of the sensor plate 52.

In the seat-load measuring apparatus 10 of this embodiment, the load imposed on the vehicle seat 1 can be detected by the load sensor 51 supported by the base frame 21. In this case, since the seat rail 8 exists between the seat bracket 9 fixed to the vehicle floor 7 and the seat-load measuring apparatus 10, even when there is a possibility that assembly stress will be produced in the seat-load measuring apparatus 10 by the influence of the upper surface of the vehicle floor 7, the assembly stress is absorbed by the clearance formed in the sliding contact portion between the upper rail 11 and the lower rail 15. Since the seat-load measuring apparatus 10 is rarely influenced by the upper surface of the vehicle floor 7, it can ensures a sufficient measuring accuracy.

When a load is imposed on the seat rail 8 in normal cases, since it is relatively light, it is supported by the base frame 21. In contrast, when a relatively heavy load is imposed on the seat rail 8, for example, in a vehicle collision, it is supported by the load support mechanism 81E and 81F of the base bracket 81.

Since a heavy load produced, for example, in a vehicle collision is supported by the load support mechanism 81E and 81F of the base bracket 81 in this way, it is dispersed and reduced, and the load imposed on the base frame 21 can be reduced to a relatively light load. Consequently, there is no need to increase the strength of the base frame 21. As a result, the dimensions of the base frame 21 do not need to be increased. Therefore, the base frame 21 can be made compact, layout restrictions can be lightened, and mounting flexibility can be increased.

Moreover, a heavy load can be reliably supported with a simple structure by making the base bracket 81 of a belt-shaped plate.

Since the base frame 21 is open at the bottom, foreign substances in this embodiment, such as dust, can be prevented from entering the interior of the base frame 21 and accumulating therein. In particular, since liquid hardly enters the base frame 21, for example, even when the passenger spills liquid such as juice, the liquid can be prevented from splashing on electrical components of the load sensor 51 in the base frame 21, and the load sensor 51 can be protected. Since this can enhance the durability of the electrical components and the reliability of the load sensor 51, the load can be stably and precisely detected by the load sensor 51 for a long period.

Moreover, since liquid can be prevented from splashing on the electrical components of the load sensor 51 in the base frame 21 without any special member, the number of components can be prevented from increasing, and there is no need to mount a special member.

Since the base frame 21 is open at the bottom, the base bottom 22 of the base frame 21 disposed at the top can be attached to the rear-rail mounting member 80 of the lower rail 15, and the base frame 21 can be easily mounted from the open side. Therefore, it is unnecessary to perform a special working operation for forming an operation hole or the like in the base frame 21 for the mounting operation, and the strength of the base frame 21 can be prevented from being decreased by such a special working operation. In addition, since a cover for closing the open bottom of the base frame 21 is unnecessary, the cost and weight can be reduced.

The operation of the upper and lower half arms 53 and 55, the sensor plate 52, and the Z-arm 61 when a load is imposed on the seat-load measuring apparatus 10 is described in detail in, for example, Patent Document 1 described above, and can be understood with reference to Patent Document 1. Therefore, the description is omitted herein. The load imposed on the seat-load measuring apparatus 10 can be calculated by the ECU on the basis of the measured strain of the sensor plate 52, as described above.

In the present invention, the rear-rail mounting member 80 is not always necessary, and may be omitted. In this case, the side frame 3 is directly attached to the base bracket 81 of the base frame 21. However, it is preferable to provide the rear-rail mounting member 80 in order to easily and reliably connect the side frame 3 and the base frame 21.

While the base frame 21 is connected to the side frame 3 in the above embodiment, the rear-base bracket 35 may be connected to the side frame 3 and the base frame 21 may be connected to the seat rail 8.

While the base frame 21 of angularly U-shaped cross section is disposed to be open at the bottom in the above embodiment, it may be disposed to be open at the top in the present invention. In this case, the front and rear mounting brackets 45 and 35 are fixed to the side frame 3, and the base frame 21 is fixed to the upper rail 11.

The load support mechanism may be provided in the base frame 21, instead of being in the base bracket 81, or may be provided in both the base bracket 81 and the base frame 21.

As is evident from the above description, in the seat-load measuring apparatus of the present invention, since the seat rail is interposed between the seat-load measuring apparatus and the vehicle body, even when there is a possibility that assembly stress will be produced in the seat-load measuring apparatus by the influence of the vehicle body, the assembly stress can be absorbed by the clearance formed in the sliding contact portion between the upper and lower rails of the seat rail. Therefore, it is possible to reduce the influence of the vehicle body on the seat-load measuring apparatus. This allows the seat-load measuring apparatus to ensure a sufficient measuring accuracy.

Moreover, even when a relatively heavy load is imposed on the vehicle seat, for example, in a vehicle collision, it can be sufficiently supported by the load support mechanism. Since the heavy load can be supported by the load support mechanism in this way, at least one of the base and the base support bracket having the load support mechanism can have a sufficient strength to withstand such a heavy load. Consequently, it is unnecessary to increase the strength of at least one of the base and the base support bracket having the load support mechanism. As a result, the dimensions of at least one of the base and the base support bracket having the load support mechanism do not need to be increased.

Since at least one of the base and the base support means having the load support means can be thereby made more compact, layout restrictions can be lightened and mounting flexibility can be increased.

In this way, the seat-load measuring apparatus of the present invention is made compact to effectively lighten layout restrictions and to increase mounting flexibility, sufficiently supports a heavy load, and ensures a sufficient measuring accuracy without any influence of the vehicle body.

The priority application, Japanese Patent Application Number 2003-113992, filed Apr. 18, 2003 is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat-load measuring apparatus comprising:
   a seat rail fixed to a vehicle body to guide a vehicle seat movably in a front-rear direction of a vehicle,
   a base frame fixed to one of the vehicle seat and the seat rail to support a load imposed on the vehicle seat;
   a base bracket fixed to the seat rail;
   an arm supported by the base frame to receive the load imposed on the vehicle seat;
   a load sensor supported by the arm to detect the load imposed on the vehicle seat; and
   wherein at least one of the base frame and the base bracket include a load support mechanism to support a load heavier than a predetermined load imposed on the vehicle seat.

2. The apparatus of claim 1, wherein the base bracket is connected to the base frame by a rivet.

3. The apparatus of claim 1, wherein the base bracket overlies the base frame.

4. The apparatus of claim 1, wherein the base bracket is positioned between the base frame and the seat rail.

5. The apparatus of claim 1, wherein the base bracket is positioned to overlie a rear end of the base frame.

6. The apparatus of claim 1, wherein both the base bracket and the base frame have a u-shape in transverse cross-section.

7. The apparatus of claim 1, further comprising a bolt extending transversely through the base frame and the base bracket.

8. The apparatus of claim 7, wherein the base bracket includes holes for receiving the bolt.

9. The apparatus of claim 8, wherein the base frame includes slots for receiving the bolt.

10. The apparatus of claim 9, wherein portions of the base frame adjacent to the slot and portions of the base bracket adjacent to the holes are configured to support a heavy load applied to the seat during a vehicle collision.

* * * * *